United States Patent
Stoyanov

(10) Patent No.: US 11,560,808 B2
(45) Date of Patent: Jan. 24, 2023

(54) SEAL ASSEMBLY FOR GAS TURBINE ENGINE

(71) Applicant: United Technologies Corporation, Farmington, CT (US)

(72) Inventor: Pantcho P. Stoyanov, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 567 days.

(21) Appl. No.: 16/574,235

(22) Filed: Sep. 18, 2019

(65) Prior Publication Data

US 2020/0088054 A1 Mar. 19, 2020

Related U.S. Application Data

(60) Provisional application No. 62/733,592, filed on Sep. 19, 2018.

(51) Int. Cl.
*F02C 7/28* (2006.01)
*F01D 11/00* (2006.01)
*F16J 15/34* (2006.01)
*F16C 33/04* (2006.01)

(52) U.S. Cl.
CPC .............. *F01D 11/005* (2013.01); *F02C 7/28* (2013.01); *F16C 33/043* (2013.01); *F16J 15/34* (2013.01); *F16J 15/3496* (2013.01); *F05D 2220/32* (2013.01); *F05D 2230/313* (2013.01); *F05D 2240/55* (2013.01); *F05D 2300/224* (2013.01); *F05D 2300/226* (2013.01); *F16C 2206/04* (2013.01)

(58) Field of Classification Search
CPC ........ F01D 11/005; F02C 7/28; F16C 33/043; F16J 15/34; F16J 15/3496
See application file for complete search history.

(56) References Cited

U.S. PATENT DOCUMENTS

| | | | |
|---|---|---|---|
| 9,844,854 B1* | 12/2017 | Gleason | .................. B24D 18/00 |
| 2002/0035026 A1* | 3/2002 | Greil | ..................... C04B 35/528 |
| | | | 501/88 |
| 2004/0031624 A1* | 2/2004 | Scott | ..................... F16J 15/3496 |
| | | | 175/371 |
| 2004/0031625 A1* | 2/2004 | Lin | ......................... E21B 10/25 |
| | | | 175/371 |

(Continued)

FOREIGN PATENT DOCUMENTS

| EP | 3284980 A1 | 2/2018 |
|---|---|---|
| JP | 2003185029 A | 7/2003 |

OTHER PUBLICATIONS

European search report for patent application No. 19198456.6 dated Jan. 31, 2020.

(Continued)

*Primary Examiner* — David E Sosnowski
*Assistant Examiner* — Theodore C Ribadeneyra
(74) *Attorney, Agent, or Firm* — Bachman & LaPointe, P.C.

(57) ABSTRACT

A seal assembly for a gas turbine engine having a seal formed of a carbon material; and a seal seat positioned for rotation relative to the seal, wherein the seal and the seal seat each have a sealing surface which together define a sliding seal, and further having a carbon film on the sealing surface of the seal seat.

11 Claims, 3 Drawing Sheets

(56) References Cited

U.S. PATENT DOCUMENTS

| | | | | |
|---|---|---|---|---|
| 2004/0042697 A1* | 3/2004 | Woydt | .................... | F16C 33/16 |
| | | | | 384/278 |
| 2004/0251639 A1* | 12/2004 | Parker | ................... | F01D 11/005 |
| | | | | 277/630 |
| 2005/0130793 A1* | 6/2005 | Doll | ........................ | F16H 48/08 |
| | | | | 475/331 |
| 2007/0275267 A1* | 11/2007 | Sabouni | ............... | F16J 15/3496 |
| | | | | 427/446 |
| 2009/0011225 A1* | 1/2009 | Moronuki | ............. | C23C 14/027 |
| | | | | 428/334 |
| 2009/0060408 A1 | 3/2009 | Nagasaka et al. | | |
| 2010/0061676 A1 | 3/2010 | Sugiyama et al. | | |
| 2011/0200280 A1* | 8/2011 | Grunaug | .............. | F16J 15/3496 |
| | | | | 384/416 |
| 2013/0209006 A1* | 8/2013 | Kolev | .................... | C23C 16/50 |
| | | | | 384/7 |
| 2014/0091535 A1* | 4/2014 | Cusack | ................ | F16J 15/3284 |
| | | | | 277/641 |
| 2017/0356493 A1* | 12/2017 | Kruhoffer | ............... | F16H 57/04 |
| 2018/0112711 A1 | 4/2018 | Itadani et al. | | |
| 2018/0245200 A1* | 8/2018 | Shinohara | ............ | F16C 33/043 |

OTHER PUBLICATIONS http://www.amardeepsteel.com/carbon-seals.html.
European search report for patent application No. 19198456.6 dated Apr. 26, 2021.

\* cited by examiner

SEAL ASSEMBLY FOR GAS TURBINE ENGINE

CROSS-REFERENCE TO RELATED APPLICATION

Benefit is claimed of U.S. Patent Application No. 62/733,592, filed Sep. 19, 2018, and entitled "SEAL ASSEMBLY FOR GAS TURBINE ENGINE", the disclosure of which is incorporated by reference herein in its entirety as if set forth at length.

BACKGROUND

The disclosure relates to a seal assembly, and more particularly to a bearing seal for a gas turbine engine.

Gas turbine engines have rotating elements mounted within stationary components at bearings which must be sealed to prevent escape of oil. Such seals are known as bearing seals or oil seals. One form of seal for such purpose is a carbon seal, where a carbon material seal is closely positioned around or relative to a rotating element. When first operated, such a seal results in the transfer of carbon from the carbon seal to the rotating element or seat of the seal assembly to form a film of carbon on the seat. This film is intended to have a low coefficient of friction with the seal, such that escape of oil between the seal and seat is prevented while operating at an acceptably low coefficient of friction.

This period of operation, when the film is formed, is referred to as the break-in phase of the seal. During break-in, excessive friction can be created, resulting in potential excessive wear on parts of the seal, excessive heat at locations of the seal or seat, and other issues. This issue is all the more serious in seals which are to operate at high velocity and relatively low pressure, which can increase the already high temperature due to friction. The present disclosure addresses this issue.

SUMMARY

In accordance with the present disclosure, there is provided a seal assembly for a gas turbine engine, comprising a seal comprising a carbon material; and a seal seat positioned for rotation relative to the seal, wherein the seal and the seal seat each have a sealing surface which together define a sliding seal, and further comprising a carbon film on the sealing surface of the seal seat.

In accordance with a further non-limiting aspect of the disclosure, the carbon film comprises a DLC film having an sp2 content and an sp3 content, wherein the sp2 content is greater than the sp3 content.

In another non-limiting aspect of the disclosure, the film has a thickness of between 100 and 200 nm. 4.

In a further non-limiting aspect of the disclosure, the carbon film is doped with a carbide-forming metal to increase wear resistance.

In a still further non-limiting aspect of the disclosure, the carbide-forming metal is selected from the group consisting of tungsten, silicon, chromium, molybdenum and combinations thereof.

In another non-limiting aspect of the disclosure, the carbide-forming metal is selected from the group consisting of tungsten, silicon and combinations thereof.

In a further non-limiting aspect of the disclosure, the seal comprises an electrographitic grade carbon.

In a still further non-limiting aspect of the disclosure, the sealing surface of the seal and the sealing surface of the seal seat have a coefficient of friction of less than 0.1.

There is also provided, in another configuration, a gas turbine engine, comprising a rotational element and a stationary seal carrier; and the seal assembly of claim 1, wherein the seal is carried by the seal carrier and the seal seat is mounted on the rotational element.

In another non-limiting configuration, a method for making a seal assembly, comprises the steps of: positioning a seal relative to a seal seat, wherein the seal comprises a carbon material; and the seal seat is positioned for rotation relative to the seal, wherein the seal and the seal seat each have a sealing surface which together define a sliding seal, and depositing a carbon film on the sealing surface of the seal seat.

In a further non-limiting embodiment, the depositing step is carried out before the positioning step.

In a still further non-limiting embodiment, the method further comprises the step of rotating the seal seat relative to the seal whereby a carbon transfer film is deposited from the seal over the carbon film on the seal seat.

In another non-limiting embodiment, the carbon film is applied to the sealing surface of the seal seat by physical vapor deposition.

Other details of the seal assembly are set forth in the following detailed description and the accompanying drawings wherein like reference numerals depict like elements.

DETAILED DESCRIPTION

The disclosure relates to a seal assembly for a gas turbine engine and, more particularly, to a carbon seal assembly for the oil seals of a gas turbine engine.

Figure 1:
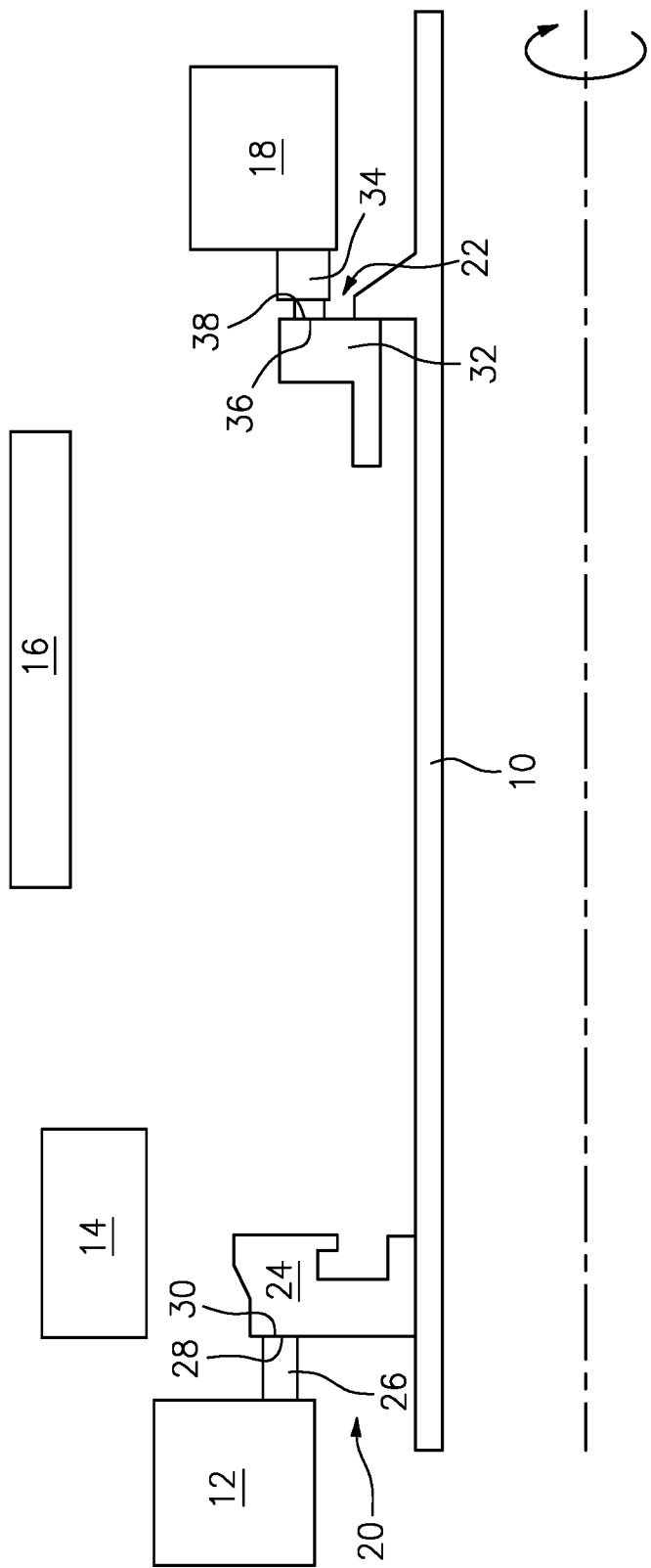
FIG. 1 illustrates a simplified cross-sectional view of a portion of a gas turbine engine.

FIG. 1 is a cross-sectional illustration of a portion of a gas turbine engine, and illustrates typical components of such an engine. Of interest to the present disclosure is a rotational shaft 10 to which are coupled various operative components of the engine, and stationary structures 12, 14, 16, 18 which cooperate with structure 10 to perform desired functions. Other features of the engine have been removed from the view of FIG. 1, or reduced to simple schematic illustration, to allow focus on features which are pertinent to the present disclosure.

In such a setting, FIG. 1 illustrates a front seal assembly 20 and a rear seal assembly 22, each of which serves to prevent leakage or flow of oil past the seal, and thereby maintain oil where desired and needed in the gas turbine engine, for example in a bearing compartment defined between the sealing assemblies 20, 22.

Seal assembly 20 is defined by a front seal seat 24 and a carbon seal 26. Carbon seal 26 remains stationary relative to rotating element 10 and seal seat 24. As shown in FIG. 1, each of these components has a sealing surface 28, 30, which together define the seal. These surfaces 28, 30 slide relative to each other and prevent leakage of oil through these surfaces. Similarly, seal assembly 22 is defined by a rear seal seat 32 and a carbon seal assembly 34, each of which has a sealing surface 36, 38 which together define the seal to prevent leakage of oil through these surfaces.

Figure 2:
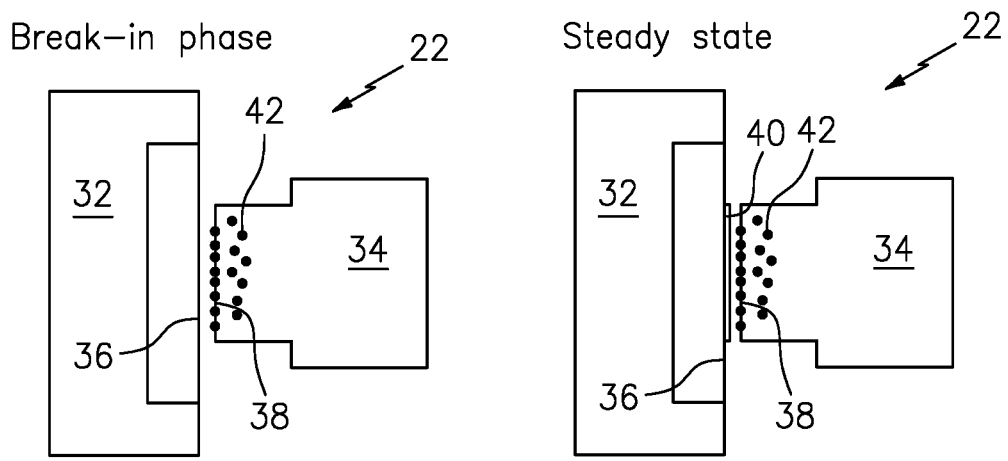
FIG. 2 illustrates a simplified cross-sectional view of a prior art seal assembly for a gas turbine engine.
Figure 3:
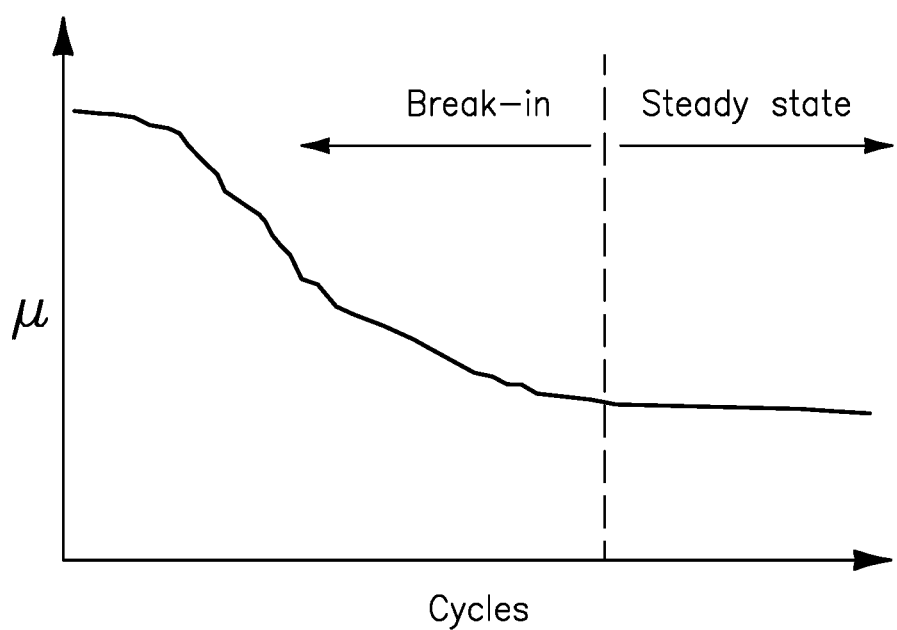
FIG. 3 illustrates coefficient of friction for the seal assembly of FIG. 2 during break-in and then steady state operation.

FIG. 2 illustrates portions of a carbon seal 34 and seal seat 32, including surfaces 36, 38. As shown, carbon seal 34 is positioned adjacent to an untreated seal seat 36, and initial operation of this seal assembly results in a break-in phase wherein a coefficient of friction between the surfaces, as shown in FIG. 3, starts relatively high and gradually decreases. The image shown in the right hand portion of FIG. 2 shows seal assembly 22 after the break-in phase. At this stage, a thin transfer film 40 has been transferred from carbon seal 34 to sealing surface 36 of seal seat 32. Once this film 40 is transferred to surface 36, seal assembly 22 operates in steady state conditions for the remainder of life of the seal assembly. FIG. 3 shows this portion of the operation of seal assembly having a relatively lower coefficient of friction than was present during the break-in phase.

FIG. 2 shows carbon seal 34 having film controllers 42 which can be provided in carbon seal 34. These film controllers 42 serve to prevent excessive build up of thickness of the transfer film 40, thereby maintaining the desired carbon-carbon sliding surfaces defined by carbon seal 34 on one side and the transfer film 40 on the other.

Figure 4:
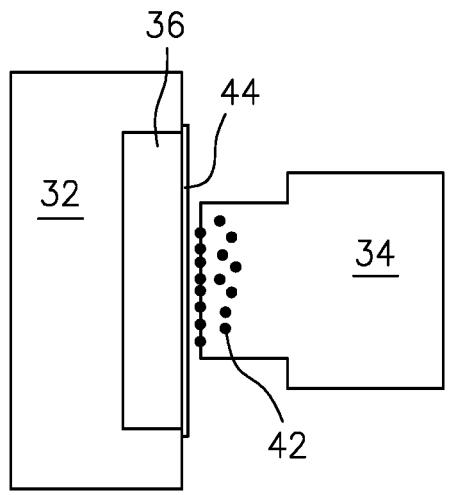
FIG. 4 illustrates a simplified cross-sectional view of a seal assembly for a gas turbine engine as disclosed herein.
Figure 5:
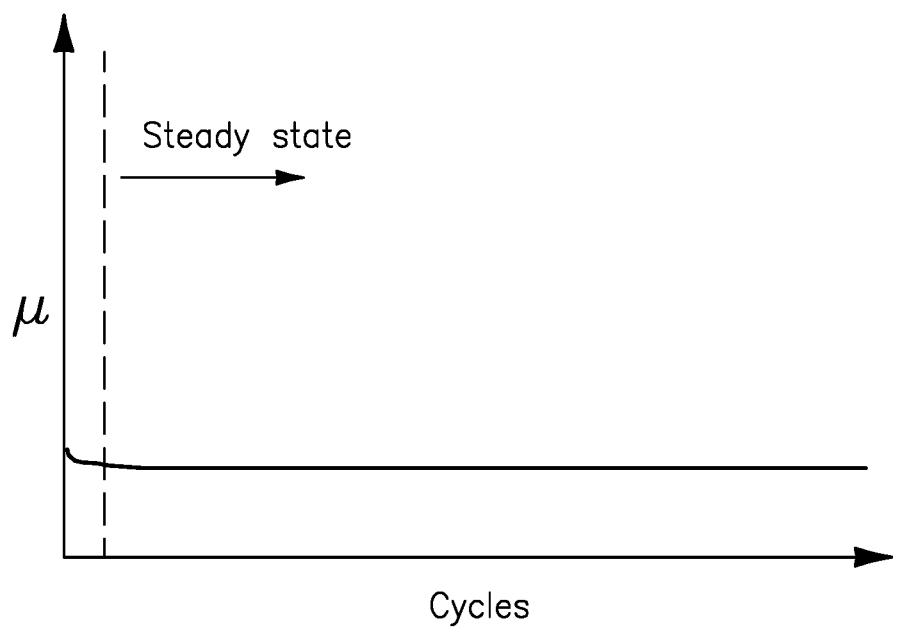
FIG. 5 illustrates coefficient of friction for the seal of FIG. 4 during break-in and then steady state operation.

FIGS. 4 and 5 together show a seal assembly of the present disclosure, wherein a carbon film 44 is initially applied to sealing surface 36 of seal seat 32. This carbon film can be provided in the form of a diamond-like carbon (DLC) thin film, and this film is applied to seal seat 32 before any operation of the seal assembly. Therefore, during initial operation of the seal assembly, carbon seal 34 slides relative to film 44, and therefore has a carbon-carbon sliding surface from the beginning of operation, without a break-in phase. This is shown in FIG. 5, wherein steady state operation begins substantially immediately, without a significant break-in phase, and the coefficient of friction at steady state is relatively low as compared to that shown in FIG. 3. During operation of a gas turbine engine having a seal assembly as shown in FIG. 4, a transfer film is still eventually deposited from carbon seal 34 over DLC thin film 44, and the thickness of this transfer film is also controlled, for example by film controllers 42 which can also be present in carbon seal 34 according to this aspect of the disclosure.

Carbon seal 34 can be provided of a suitable electrocarbon such as FT2650, which is an electrographitic grade carbon. The seal seat can typically be provided from a wide variety of different materials, including but not limited to structures having a chromium carbide coated counterface or seal seat.

Film 44 can be, as specified above, a DLC thin film formed from a DLC material having sp2 and sp3 content, wherein the sp2 content is greater than the sp3 content. The sp2 content is indicative of graphitic content of the material, while the sp3 content is indicative of the diamond-like content of the material. In one non-limiting configuration, the sp2 content of the film material is greater than the sp3 content. Another aspect for characterizing the DLC material is referred to as micro-Raman. Micro-Raman provides a 'G' peak and a 'D' peak, which refer to disorder and graphite respectively. DLC film for use in the present disclosure can have a I(D)/I(G) peak ratio of < or =1.0 based on micro-Raman analysis.

In another non-limiting configuration, the DLC film can be doped with carbide-forming metals to improve wear resistance of the film. Such carbide-forming metals can include tungsten or silicon or combinations thereof, and these metals help to form carbides in the film which increase wear resistance. In some instances, the carbide-forming metal can also or in addition be chromium or molybdenum or combinations thereof, which can also assist in the formation of carbides.

With reference back to FIG. 1, it should be appreciated, that seal 26, 34 can be mounted in a gas turbine engine by being fixed to any suitable structure or seal carrier such as structure 12, 18. Further, seal seat 24, 36 can suitably be mounted to rotational member 10 such that sealing surfaces 28, 30, and 36, 38, respectively, are in close sliding proximity to each other when rotational element 10 is rotated.

The DLC film 44 can suitably be applied to the seal seat through physical vapor deposition (PVD), and can suitably have a thickness of between 100 and 200 nm. Other methods of application of film 44 can be utilized within the broad scope of the present disclosure, such as chemical vapor deposition (CVD) and the like.

DLC film 44 can suitably be applied to the seal seat before the seal assembly is assembled into the gas turbine engine. In this way, when the seal assembly is started in operation, film 44 is already in place and the break-in phase is short and much less harsh as shown in comparison of FIGS. 3 and 5.

It should be appreciated that the illustrations of FIGS. 4 and 5 are presented with respect to a rear seal assembly. Illustrations of the same components for a front seal assembly are not provided herein, as the structures would be the same but for being reversed left-to-right.

It should be appreciated that the pre-application of a DLC thin film 44 (FIG. 4) in accordance with the present disclosure produces a low friction and wear-resistant carbon-based seal interface which, for example, can operate effectively between 200 and 350° F., under elevated sliding velocities. This, in turn, can reduce sub-surface heating (for example due to frictional heating) by reducing the friction co-efficient and improving the break-in phase, which will consequently improve long term wear resistance of the seal system.

Application of a carbon film to the seal seat, such as the DLC film referred to above, creates a carbon-carbon interface with low friction from the beginning of operation, and therefore produces a very short break-in phase. During initial operation, a transferred film is still formed on the seal seat, specifically over the DLC film, and this configuration remains through steady state operation of the seal.

It should be appreciated that the low friction and wear resistance produced by the seal assembly as disclosed herein can be useful, for example in bearing seals in gas turbine engines, and in other locations as well, and can significantly increase the endurance life of engine components. Further, utilization of seal assemblies as disclosed herein can significantly reduce overall costs by reducing the number of parts that are stripped prematurely due to wear and thermal damage issues.

There has been provided a seal assembly and method wherein the break-in phase is reduced in length and impact on seal components, and wherein steady state performance of the seal assembly is improved as compared to a seal assembly without the initial DLC film application. While the seal assembly has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A seal assembly for a gas turbine engine, comprising:
a seal comprising a carbon material, wherein the seal comprises an electrographitic grade carbon; and
a seal seat comprising a chromium carbide material, said seal seat being positioned for rotation relative to the seal, wherein the seal and the seal seat each have a sealing surface which together define a sliding seal, and further comprising a carbon film on the sealing surface of the seal seat over the chromium carbide material, wherein the carbon film is doped with a carbide-forming metal.

2. The seal assembly of claim 1, wherein the carbon film comprises a DLC film having an sp2 content and an sp3 content, wherein the sp2 content is greater than the sp3 content.

3. The seal assembly of claim 2, wherein the carbon film has a thickness of between 100 and 200 nm.

4. The seal assembly of claim 1, wherein the carbide-forming metal is selected from the group consisting of tungsten, silicon, chromium, molybdenum and combinations thereof.

5. The seal assembly of claim 1, wherein the carbide-forming metal is selected from the group consisting of tungsten, silicon and combinations thereof.

6. The seal assembly of claim 1, wherein the sealing surface of the seal and the sealing surface of the seal seat have a coefficient of friction of less than 0.1.

7. A gas turbine engine, comprising:
a rotational element and a stationary seal carrier; and
the seal assembly of claim 1, wherein the seal is carried by the seal carrier and the seal seat is mounted on the rotational element.

8. A method for making a seal assembly, comprising the steps of:
positioning a seal relative to a seal seat, wherein the seal comprises an electrographitic grade carbon; and the seal seat comprises a chromium carbide material, said seal seat is positioned for rotation relative to the seal, wherein the seal and the seal seat each have a sealing surface which together define a sliding seal, and
depositing a carbon film on the sealing surface of the seal seat over the chromium carbide material, wherein the carbon film is doped with a carbide-forming metal.

9. The method of claim 8, wherein the depositing step is carried out before the positioning step.

10. The method of claim 8, further comprising the step of rotating the seal seat relative to the seal whereby a carbon transfer film is deposited from the seal over the carbon film on the seal seat.

11. The method of claim 8, wherein the carbon film is applied to the sealing surface of the seal seat by physical vapor deposition.

* * * * *